United States Patent
Takeuchi et al.

(10) Patent No.: US 10,835,874 B2
(45) Date of Patent: Nov. 17, 2020

(54) FLUID SEPARATION MEMBRANE, FLUID SEPARATION MEMBRANE MODULE, AND POROUS CARBON FIBER

(71) Applicant: Toray Industries, Inc., Tokyo (JP)

(72) Inventors: Kosaku Takeuchi, Otsu (JP); Dai Kondo, Otsu (JP); Kentaro Tanaka, Otsu (JP); Takaaki Mihara, Otsu (JP); Tomoyuki Horiguchi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 124 days.

(21) Appl. No.: 16/070,695

(22) PCT Filed: Jan. 17, 2017

(86) PCT No.: PCT/JP2017/001408
§ 371 (c)(1),
(2) Date: Jul. 17, 2018

(87) PCT Pub. No.: WO2017/126501
PCT Pub. Date: Jul. 27, 2017

(65) Prior Publication Data
US 2019/0022599 A1     Jan. 24, 2019

(30) Foreign Application Priority Data

Jan. 22, 2016 (JP) .................... 2016-010448

(51) Int. Cl.
*B01D 69/10* (2006.01)
*B01D 69/08* (2006.01)
(Continued)

(52) U.S. Cl.
CPC .......... *B01D 69/10* (2013.01); *B01D 53/228* (2013.01); *B01D 63/04* (2013.01);
(Continued)

(58) Field of Classification Search
CPC .. B01D 53/228; B01D 63/04; B01D 67/0067; B01D 67/0079; B01D 69/10;
(Continued)

(56) References Cited

U.S. PATENT DOCUMENTS

| 5,089,135 A | * | 2/1992 | Yoneyama ......... B01D 67/0067 |
| | | | 210/500.23 |
| 5,288,304 A | * | 2/1994 | Koros .................. B01D 53/228 |
| | | | 95/45 |

(Continued)

FOREIGN PATENT DOCUMENTS

| CN | 106536028 A | 3/2017 |
| JP | 56070805 | 6/1981 |

(Continued)

OTHER PUBLICATIONS

Extended European Search Report for European Application No. 17 741 379.6, dated Jul. 23, 2019, 10 pages.
(Continued)

*Primary Examiner* — Jason M Greene
(74) *Attorney, Agent, or Firm* — RatnerPrestia

(57) ABSTRACT

A fluid separation membrane has high compression strength in the fiber cross-section direction (direction orthogonal to the fiber axis). The fluid separation membrane is obtained by an organic polymer layer being formed on the surface of porous carbon fibers having a co-continuous porous structure. A fluid separation membrane module and porous carbon fibers having a fully co-continuous porous structure are also disclosed.

7 Claims, 1 Drawing Sheet

(51) Int. Cl.
    *B01D 71/64*     (2006.01)
    *C01B 32/18*     (2017.01)
    *B01D 71/42*     (2006.01)
    *C01B 32/15*     (2017.01)
    *B01D 71/34*     (2006.01)
    *B01D 71/36*     (2006.01)
    *B01D 71/68*     (2006.01)
    *B01D 69/12*     (2006.01)
    *D06M 15/59*     (2006.01)
    *C01B 32/182*     (2017.01)
    *B01D 71/16*     (2006.01)
    *B01D 71/52*     (2006.01)
    *B01D 71/56*     (2006.01)
    *B01D 69/14*     (2006.01)
    *B01D 67/00*     (2006.01)
    *B01D 71/02*     (2006.01)
    *B01D 53/22*     (2006.01)
    *B01D 63/04*     (2006.01)
    *D06N 3/00*     (2006.01)

(52) U.S. Cl.
    CPC ..... *B01D 67/0067* (2013.01); *B01D 67/0079* (2013.01); *B01D 69/08* (2013.01); *B01D 69/12* (2013.01); *B01D 69/141* (2013.01); *B01D 71/021* (2013.01); *B01D 71/16* (2013.01); *B01D 71/34* (2013.01); *B01D 71/36* (2013.01); *B01D 71/42* (2013.01); *B01D 71/52* (2013.01); *B01D 71/56* (2013.01); *B01D 71/64* (2013.01); *B01D 71/68* (2013.01); *C01B 32/15* (2017.08); *C01B 32/18* (2017.08); *C01B 32/182* (2017.08); *D06M 15/59* (2013.01); *D06N 3/0015* (2013.01); *D06N 3/0056* (2013.01); *B01D 2053/224* (2013.01); *B01D 2325/026* (2013.01); *B01D 2325/24* (2013.01); *C01P 2006/17* (2013.01); *D06N 2201/087* (2013.01)

(58) Field of Classification Search
    CPC .... B01D 69/105; B01D 69/12; B01D 71/021; B01D 71/64; B01D 2325/026; B01D 2325/24; C01B 32/15; C01B 32/18; C01B 32/182; B01J 20/20
    See application file for complete search history.

(56) References Cited

U.S. PATENT DOCUMENTS

| | | |
|---|---|---|
| 8,366,804 B2 | 2/2013 | Liu et al. |
| 2016/0362541 A1 | 12/2016 | Mihara et al. |
| 2017/0166451 A1* | 6/2017 | Horiguchi .......... B01J 20/28023 |
| 2017/0194650 A1 | 7/2017 | Mihara et al. |
| 2017/0216779 A1 | 8/2017 | Takeuchi et al. |
| 2017/0296980 A1* | 10/2017 | Noda ................. B01J 20/20 |

FOREIGN PATENT DOCUMENTS

| | | | |
|---|---|---|---|
| JP | 61133106 A | 6/1986 | |
| JP | 0274615 A | 3/1990 | |
| JP | 2012040464 A | 3/2012 | |
| JP | 2014079709 A | 5/2014 | |
| WO | 2010111755 A2 | 10/2010 | |
| WO | 2015129488 A1 | 9/2015 | |
| WO | 2016002668 A1 | 1/2016 | |
| WO | 2016009935 A1 | 1/2016 | |
| WO | 2016013676 A1 | 1/2016 | |
| WO | WO 2016/002668 A1 * | 1/2016 | ............. B01J 20/20 |

OTHER PUBLICATIONS

International Search Report and Written Opinion for International Application No. PCT/JP2017/001408, dated Apr. 11, 2017—13 pages.
Chinese Office Action for Chinese Application No. 201780007026.0, dated Jun. 3, 2020 with translation, 14 pages.
Notice of Reasons for Refusal for Japanese Application No. 2017-505878, dated Aug. 4, 2020, with translation, 17 pages.
Indonesian Office Action for Indonesian Application No. PID201805452, dated Mar. 18, 2020 with translation, 4 pages.
Taiwan Office Action for Taiwan Application No. 106101989, dated Aug. 10, 2020 with translation, 8 pages.

* cited by examiner

US 10,835,874 B2

FLUID SEPARATION MEMBRANE, FLUID SEPARATION MEMBRANE MODULE, AND POROUS CARBON FIBER

CROSS REFERENCE TO RELATED APPLICATIONS

This is the U.S. National Phase application of PCT/JP2017/001408, filed Jan. 17, 2017, which claims priority to Japanese Patent Application No. 2016-010448, filed Jan. 22, 2016, the disclosures of these applications being incorporated herein by reference in their entireties for all purposes.

TECHNICAL FIELD OF THE INVENTION

The present invention relates to a fluid separation membrane, a fluid separation membrane module, and a porous carbon fiber.

BACKGROUND OF THE INVENTION

A membrane separation process is used as a process for selectively separating and refining a specific component from various mixed gases or mixed liquids. The membrane separation process attracts attention because it is an energy-saving process as compared with other fluid separation processes.

For example, in a natural gas refining plant, it is necessary to separate and remove carbon dioxide as impurity contained in methane gas which is a major component. As a difference in pressure between the upstream side and the downstream side of a separation membrane is increased, the permeation rate is improved. It is therefore desired to carry out the separation and refining with a high gas pressure of at least several MPa in view of efficient energy use.

In addition, in the chemical industry, it is started that the membrane separation process is used in a process for separating and refining water as impurity contained in alcohol or acetic acid. It is desired to carry out the separation and refining with a high pressure in order to improve the permeation flow rate of a substance to be separated.

A hollow fiber-like separation membrane has been proposed as the separation membrane for use in the membrane separation process. The hollow fiber-like separation membrane has a large membrane area per unit volume, and it can be manufactured continuously. Because of these aspects, the hollow fiber-like separation membrane is more advantageous than a sheet-like separation membrane or a composite separation membrane of a ceramic substrate (for example, Patent Documents 1 and 2).

PATENT DOCUMENTS

Patent Document 1: JP-A-61-133106
Patent Document 2: U.S. Pat. No. 8,366,804

SUMMARY OF THE INVENTION

Generally, for a hollow fiber membrane made of an organic polymer as described in Patent Document 1 or 2, it is studied that the membrane thickness is reduced in order to improve the permeation rate of fluid. When the membrane thickness is reduced, compression strength in a sectional direction of fiber (a direction perpendicular to the axis of the fiber) deteriorates so that it is difficult to use the hollow fiber membrane under a high pressure.

The present invention has been developed in consideration of the aforementioned past circumstances and thus the problem to be solved is to provide a fluid separation membrane having a high compression strength in a sectional direction of fiber.

As a result of diligent studies, the present inventors found that the aforementioned problem can be solved by forming an organic polymer layer on a surface of a porous carbon fiber having a co-continuous porous structure, and completed the present invention.

Namely, the present invention relates to the following <1> to <14>.

<1> A fluid separation membrane in which an organic polymer layer is formed on a surface of a porous carbon fiber having a co-continuous porous structure.

<2> The fluid separation membrane according to <1>, in which the co-continuous porous structure is provided all over the porous carbon fiber.

<3> The fluid separation membrane according to <1> or <2>, in which an average pore diameter of the porous carbon fiber as a whole measured by a mercury intrusion method is 30 nm to 5,000 nm.

<4> The fluid separation membrane according to any one of <1> through <3>, in which an average pore diameter in the surface of the porous carbon fiber measured by surface observation with a scanning electron microscope is 2 nm to 500 nm.

<5> The fluid separation membrane according to any one of <1> through <4>, in which the co-continuous porous structure has a structural period of 10 nm to 10,000 nm.

<6> The fluid separation membrane according to any one of <1> through <5>, in which a half-value width of an intensity peak of X-ray scattering of the porous carbon fiber is 5° or less.

<7> The fluid separation membrane according to any one of <1> through <6>, in which the organic polymer layer is a layer comprising one or two or more kinds of organic polymers selected from the group consisting of aromatic polyimide, cellulose acetate, polysulfone, aromatic polyamide, polyether imide, polyether sulfone, polyacrylonitrile, polyphenylene sulfide, polyether ether ketone, polytetrafluoroethylene, polyvinylidene fluoride, and derivatives thereof.

<8> The fluid separation membrane according to any one of <1> through <7>, in which the organic polymer layer is a layer comprising one or two or more kinds of organic polymers selected from the group consisting of aromatic polyimide, aromatic polyamide, and derivatives thereof.

<9> A fluid separation membrane module in which a plurality of the fluid separation membranes according to any one of <1> through <8> are housed in a casing.

<10> A porous carbon fiber having a co-continuous porous structure all over therein.

<11> The porous carbon fiber according to <10>, in which an average pore diameter as a whole measured by a mercury intrusion method is 30 nm to 5,000 nm.

<12> The porous carbon fiber according to <10> or <11>, in which an average pore diameter in a surface thereof measured by surface observation with a scanning electron microscope is 2 nm to 500 nm.

<13> The porous carbon fiber according to any one of <10> through <12>, in which the co-continuous porous structure has a structural period of 10 nm to 10,000 nm.

<14> The porous carbon fiber according to any one of <10> through <13>, in which a half-value width of an intensity peak of X-ray scattering is 5° or less.

According to the present invention, it is possible to provide a fluid separation membrane having a high compression strength in a sectional direction of fiber (a direction perpendicular to the axis of the fiber), and it is possible to enhance durability of a fluid separation membrane module.

DETAILED DESCRIPTION OF EMBODIMENTS OF THE INVENTION

<Fluid Separation Membrane>
[Porous Carbon Fiber]

A fluid separation membrane of the present invention (which may be simply referred to as "fluid separation membrane" or "separation membrane") uses, as its substrate, porous carbon fiber having a co-continuous porous structure.

In the present invention, the porous carbon fiber preferably contains 60 to 90 weight % of a carbon component. When the carbon component is 60 weight % or more, the heat resistance and the chemical resistance of the porous carbon fiber tend to be improved. The carbon component of the porous carbon fiber is more preferably 65 weight % or more. On the other hand, when the carbon component is 90 weight % or less, the flexibility is improved so that a bending radius of the porous carbon fiber can be reduced to improve the handleability thereof. The carbon component of the porous carbon fiber is more preferably 85 weight % or less.

The weight ratio of the carbon component obtained by measuring carbon, hydrogen and nitrogen components by organic element analysis is used as the carbon component ratio. When the total of the carbon, hydrogen and nitrogen components does not reach 100 weight %, it is suggested that there is another element such as oxygen.

Figure 1:
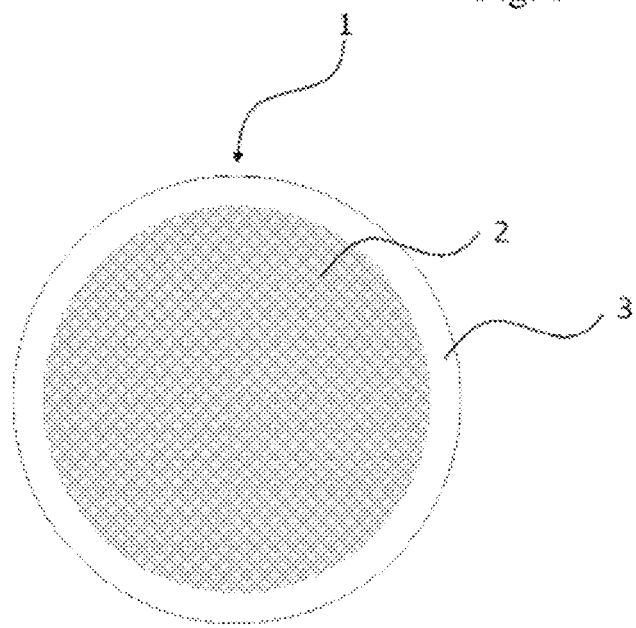
FIG. 1 is a schematic view showing a structure of a fiber section of a fluid separation membrane of the present invention.
Figure 2:
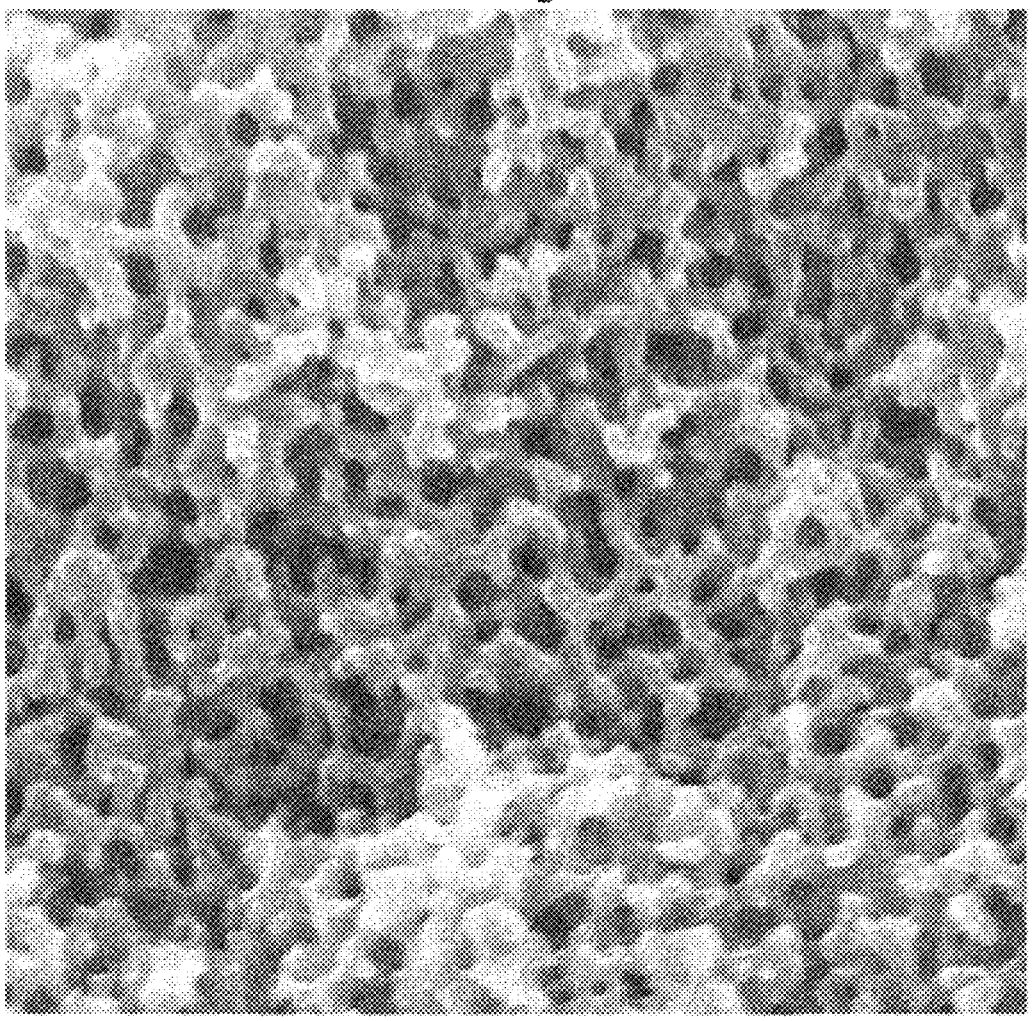
FIG. 2 is a scanning electron microscopic photograph of a co-continuous porous structure of the porous carbon fiber of the present invention.

The co-continuous porous structure is a structure in which branches (carbon part) and pores (voids) are respectively interconnected and regularly intertwined with each other three-dimensionally. Specifically, as illustrated in FIG. 2 by way of example, when a specimen which has been sufficiently cooled in liquid nitrogen is cut with tweezers or the like and the cut surface of the section thus obtained is examined with a scanning electron microscope, then a structure in which branches and voids are respectively interconnected inward is observed.

This structure possessed by the porous carbon fiber produces an effect in which the branches of the carbon skeleton can support one another to maintain the whole structure and stress is distributed all over the fiber. Consequently, carbon fiber has high resistance to external force such as compression or bending in the sectional direction of the fiber (the direction perpendicular to the axis of the fiber), so that the compression strength and the compression ratio strength can be improved. In addition, the voids connect with one another three-dimensionally so as to serve as flow channel for supplying or discharging fluid such as gas or liquid in the sectional direction of the fiber and in the axial direction of the fiber.

An example of the co-continuous porous structure may include a lattice-like structure or a monolithic structure. Although not limited particularly, the monolithic one is preferred in order to attain the aforementioned effect. The compression strength in the sectional direction of the fiber tends be improved when the structure is monolithic.

The monolithic structure is a form in which the carbon skeleton in the co-continuous porous structure has a three-dimensional mesh structure, which is distinguished from an irregular structure such as a structure in which individual particles have been aggregated and coupled with one another, or on the contrary, a structure which is formed by voids and a skeleton around the voids, where the voids are generated by removing template particles aggregated and coupled with one another.

It is preferable that the porous carbon fiber has a co-continuous porous structure all over, and pores are open in the surface thereof. When pores are open in the surface of the fiber, pressure loss of fluid in the sectional direction of the fiber is reduced so that the permeation rate of the fluid separation membrane can be improved. In addition, due to an uneven structure in the surface of the fiber, adhesion to an organic polymer layer which will be described later is improved by an anchoring effect.

Here, to have a co-continuous porous structure all over means that when the surface of the porous carbon fiber is measured at any 10 places by a scanning electron microscope, the co-continuous porous structure is present at all the places, and pores whose average pore diameter is 2 nm or more are observed as described later. In addition, when the porous carbon fiber is a hollow fiber, the co-continuous porous structure may be present in at least one of the external surface and the internal surface of the hollow fiber.

With respect to the average pore diameter of the pores as a whole, which pores form the co-continuous porous structure of the porous carbon fiber, too small values thereof result in an increase in pressure loss in the axial direction of the fiber and in the sectional direction of the fiber increases and hence a decrease in fluid permeability. Therefore, the average diameter of all the pores is preferably 30 nm or more and more preferably 100 nm or more.

Meanwhile, in case where the average pore diameter of the pores as a whole is too large, the effect in which the carbon branches support one another to maintain the whole structure is reduced, resulting in a decrease in compression strength. Therefore, the average diameter of all the pores is preferably 5,000 nm or less and more preferably 2,500 nm or less.

Here, the average pore diameter of the pores as a whole is a value measured by measurement of a pore diameter distribution in the separation membrane by a mercury intrusion method. In the mercury intrusion method, mercury is infiltrated into pores of the co-continuous porous structure by pressure application, and the volume of the pores and the specific surface area are determined from the pressure and the amount of the mercury intruded. On the assumption that the pores are cylindrical, pore diameters are calculated from a relationship between the pore volume and the specific surface area. By the mercury intrusion method, a pore diameter distribution curve from 5 nm to 500 µm can be acquired. The organic polymer layer, which will be described later, has substantially no pores. Accordingly, the average diameter of the pores in the whole separation membrane is substantially the same as the average diameter of pores in the co-continuous porous structure of the porous carbon fiber.

When the porous carbon fiber has a large pore diameter on its surface, the gas permeation rate of the fluid separation membrane is improved. Thus, the average pore diameter on the surface is preferably 2 nm or more, more preferably 10 nm or more, and even more preferably 50 nm or more. On the other hand, if the pore diameter on the surface is too large, organic polymers may be penetrated into the porous carbon fiber when an organic polymer layer is formed, so that the organic polymer layer may not be able to uniformly be disposed on the surface. Therefore, the average pore diameter in the surface is preferably 500 nm or less, more preferably 400 nm or less, and even more preferably 300 nm or less.

Here, a measured value analyzed by surface observation in a scanning electron microscope is used as the average pore diameter on the surface of the porous carbon fiber. Specifically, the surface of the porous carbon fiber is observed with 700,000 pixels or more at a magnification of 1±0.1 (nm/pixel), and an image acquired thus is analyzed by image analysis software to separate the surface of the fiber into branches (carbon parts) and pores (void parts). Next, an average value of areas of the pores in the image is calculated, and a diameter of a perfect circle having the same area as the average area is regarded as the average pore diameter. Here, when the number of pores observed in the image by the aforementioned method is less than 10, the average pore diameter is calculated using an image acquired by observation with 700,000 pixels or more at a magnification of 10±1 (nm/pixel).

In the fluid separation membrane of the present invention in which an organic polymer layer has been formed, the organic polymer layer which is a surface layer is dissolved or decomposed and removed by a solvent which can dissolve or decompose the organic polymer layer, or the organic polymer layer is thermally decomposed and removed at a temperature in which the structure of the porous carbon fiber does not change, to expose the surface of the porous carbon fiber. Then, the average pore diameter on the surface is measured.

When either processing is difficult, the fluid separation membrane is sufficiently cooled in liquid nitrogen, and cut with tweezers or the like to expose a cross section of the fiber. Subsequently, the cross section of the fiber is observed by a scanning electron microscope. The average pore diameter can be calculated by the aforementioned method from an image in which the vicinity of the interface between the porous carbon fiber and the organic polymer layer has been observed.

In the porous carbon fiber, it is preferable that the pores on the surface extend to the central part of the fiber. Whether the pores extend to the central part or not is confirmed by the following method. That is, gas permeation rates in the porous carbon fiber are measured using pure gases of carbon dioxide and nitrogen respectively. When the gas permeation rate ratio $CO_2/N_2$ is 1.0 or 0.80 (that is, Knudsen diffusion mechanism), it is determined that the pores are extended.

It is preferable that a structural period of the co-continuous porous structure in the porous carbon fiber is 10 nm to 10,000 nm. The fact that the porous carbon fiber has a structural period means that the porous structure has a high uniformity, and the branch thickness of the carbon skeleton and the pore size are uniform. Thus, it is possible to obtain an effect of improving the compression strength of the porous carbon fiber or the fluid separation membrane.

Generally, when the pore size is not uniform, water repellency or surface roughness in a porous carbon support is not uniform. Thus, forming an organic polymer layer with a uniform thickness tends to be difficult. However, in the porous carbon fiber having a co-continuous porous structure all over therein according to the present invention, the thickness of the organic polymer layer can be made uniform in spite of coating solution (organic polymer solution) with low density or viscosity.

When the structural period is 10,000 nm or less, the carbon skeleton and the pores form a fine structure to improve the compression strength. Therefore, the structural period is more preferably 5,000 nm or less, and further more preferably 3,000 nm or less.

On the contrary, when the structural period is 10 nm or more, the pressure loss at the time of flowing fluid through the voids can be reduced and the fluid permeation rate improves. When the pressure loss is reduced, it is possible to obtain an effect that separation and refining can be performed while saving greater energy more. Therefore, the structural period is more preferably 100 nm or more, and even more preferably 300 nm or more.

The structural period of the co-continuous porous structure is calculated using the following equation from the scattering angle $2\theta$ corresponding to the position of a peak top regarding the intensity of scattered light resulting from small-angle scattering when the porous carbon fiber of the present invention is irradiated with X-rays.

$$L = \frac{\lambda}{2 \sin \theta} \quad \text{[Equation 1]}$$

L: structural period, λ: wavelength of incident X-rays

It is noted, however, there are cases where the structural period is so large that the small-angle scattering cannot be observed. In that case, the structural period is obtained through X-ray computerized tomography (X-ray CT). Specifically, three-dimensional images captured by the X-ray CT are subjected to Fourier-transformation, and the resultant two-dimensional spectra is processed by circular averaging to obtain a one-dimensional spectrum. The characteristic wavelength corresponding to the position of a peak top in the one-dimensional spectrum is determined, and the structural period is calculated as the inverse of the wavelength.

Further, when the co-continuous porous structure has high evenness, the effect of distributing stress throughout the whole fluid separation membrane can be obtained, and hence the compression strength is enhanced. The evenness of the co-continuous porous structure can be determined in terms of the half-value width of a peak of scattered-light intensity observed when the porous carbon fiber is irradiated with X-rays.

Specifically, the porous carbon fiber of the present invention is irradiated by an X-ray, and it is determined that the smaller the half-value with of a peak of scattered-light intensity, the higher the evenness is. The half-value width of the peak is preferably 5° or less, more preferably 1° or less, and even more preferably 0.1° or less.

The half-value width of a peak in the present invention means the width determined in the following manner. The vertex of the peak is called point A, and a straight line parallel to the ordinate of the graph is drawn from a point A. The intersection of the straight line and the base line of the spectrum is called point B, and the width of the peak as measured at the center (point C) of the segment that connects point A and point B is taken as the half-value width. In addition, the width of the peak herein means the width thereof as measured along the straight line which is parallel to the base line and passes through point C.

It is preferable that an average porosity of the co-continuous porous structure is 20% to 80%.

The term "average porosity" means a porosity determined by obtaining a precise cross-section of an embedded specimen by the cross-section polisher method (CP method), examining the cross-section at a magnification regulated so as to result in 1±0.1 (nm/pixel) and at 700,000 pixels or higher, setting in the resultant image a square examination region for calculation in which each side has 512 pixels, calculating a porosity using the following equation, in which A is the area of the pores and B is the area of the carbons, and calculating an arithmetic average for any 20 sites within the cross-section. In the case where the porous carbon fiber has a hollow portion, the area of the hollow portion is not included in the pore area.

Average porosity (%)=$A/B\times 100$

The higher the average porosity is, the lower the pressure loss of fluid can be and hence the permeation rate can increase. Therefore, the average porosity is more preferably 25% or more, and even more preferably 28% or more. Meanwhile, the lower the average porosity is, the higher the average bulk density becomes and hence, the compression ratio strength increases. Therefore, the average porosity is more preferably 75% or less, and even more preferably 70% or less. The average porosity is appropriately set in accordance with a desired permeation rate of fluid and desired compression strength.

The higher the compression strength of the fluid separation membrane and the porous carbon fiber of the present invention is, the higher the pressure under which they can be preferably used is. The compression strength is preferably 10 MPa or more, more preferably 20 MPa or more, and even more preferably 30 MPa or more.

Here, the compression strength is measured using a microcompression tester as follows. One porous carbon fiber is held by jigs and compressed in a cross-sectional direction of the fiber (a direction perpendicular to the axis of the fiber), to measure the compression displacement and the load. Compression strength σ is calculated by the following equation.

$$\sigma = \frac{2F}{\pi \cdot d \cdot l}$$ [Equation 2]

σ: compression strength in cross-sectional direction of fiber, F: breaking load, d: fiber diameter, l: fiber length The higher the compression ratio strength is, the higher in strength the material is. By way of example, the compression ratio strength is preferably 10 N·m/kg or more, and more preferably 20 N·m/kg or more. Here, the compression ratio strength is calculated by dividing the compression strength by the average bulk density.

[Shape of Fluid Separation Membrane]

The fluid separation membrane of the present invention uses the porous carbon fiber as a substrate. Here, the fiber refers to a fiber in which a ratio (aspect ratio L/D) of a fiber length L to a fiber diameter D is 100 or more. The cross-sectional shape of the porous carbon fiber and the cross-sectional shape of the fluid separation membrane are not limited, and they can be formed into any shape such as a round cross-section, a polygonal cross-section, a multi-lobar cross-section, a flat cross-section, etc. The round section is preferred because the strength distribution within the cross-section is uniform so that the compression strength and the compression ratio strength in the cross-sectional direction of the fiber are more improved.

A separation membrane in which a hollow fiber having a hollow portion is used as the porous carbon fiber is also an embodiment of the present invention. Description will be made below about the case where the porous carbon fiber having a hollow portion is used as a substrate.

The hollow portion in the present invention means a cavity which is continuously formed along the fiber axis direction and which is substantially even in diameter. The hollow portion, together with the co-continuous structure, functions as a channel for fluids. The presence of the hollow portion reduces the pressure loss which occurs when a fluid passes in the fiber axis direction, regardless of whether the fluid is caused to permeate in the external-pressure mode or the internal-pressure mode, and the fluid permeability hence improves as compared with porous carbon membranes having no hollow cross-section. Especially in the case of the internal-pressure mode, the pressure loss is lowered, and therefore, a further improvement in permeability is attained.

It is preferable that the area ratio of the cross-sectional area A of the hollow portion to the cross-sectional area B of the porous carbon fiber (hollow area ratio A/B) is 0.001 to 0.7. Here, the cross-sectional area B of the porous carbon fiber is a cross-sectional area including the cross-sectional area A of the hollow portion. The higher the area ratio of the hollow portion, the lower the pressure loss and the more the fluid permeability is improved. Consequently, the area ratio of the hollow portion is more preferably 0.01 or higher, even more preferably 0.05 or higher.

Meanwhile, the lower the area ratio of the hollow portion, the higher the compression strength. Consequently, the area ratio of the hollow portion is more preferably 0.6 or less. In cases when the area ratio of the hollow portion is within that range, an excellent balance between compression strength and permeation rate is attained.

In addition, in order to have both compression strength and permeation rate, the membrane may have a plurality of hollow portions. In this case, the sum of the cross-sectional areas of the hollow portions is taken as the cross-sectional area A of the hollow parts.

The hollow portion may be formed into any cross-sectional shape such as a round cross-section, a polygonal cross-section, a multi-lobar cross-section, a flat cross-section, etc. The round cross-section is preferred because the compression strength is more improved.

In the present invention, even when the porous carbon fiber has a hollow portion, it is preferable that pores extend from a surface facing the hollow portion of the porous carbon fiber (hereinafter sometimes referred to as "internal surface") to an external surface.

When the average diameter of the porous carbon fiber is small, the compression strength is improved. Therefore, the average diameter of the porous carbon fiber is preferably 500 μm or less, more preferably 400 μm or less, and further more preferably 300 μm or less. A lower limit value of the average diameter of the fiber is not particularly limited, and may be decided desirably. However, in order to improve handleability when a separation membrane module is manufactured, the lower limit value is preferably 10 μm or more.

In addition, the smaller the average diameter in the porous carbon fiber and the fluid separation membrane is, the more the number of fibers which can be filled per unit volume is. Thus, the membrane area per unit volume can be increased to increase the permeation flow rate per unit volume.

The average length of the fiber can be determined desirably. In order to improve handleability in making into the separation module or to improve the permeation performance of fluid, the average length of the fiber is preferably 10 mm or more.

In the fluid separation membrane of the present invention, the porous carbon fiber serves as a substrate of the separation membrane, and also has a function as a fluid channel. Due to such a structure, the compression strength is improved.

[Organic Polymer Layer]

The fluid separation membrane of the present invention includes an organic polymer layer which is formed on a surface of the aforementioned porous carbon fiber. When the porous carbon fiber is a hollow fiber having a hollow portion, the organic polymer layer may be formed in an internal surface of the hollow portion.

A raw material of the organic polymer layer is not limited particularly. Examples of such raw materials may include aromatic polyimide, cellulose acetate, polysulfone, aromatic polyamide, polyamide imide, polyether imide, polyether sulfone, polyacrylonitrile, polyphenylene sulfide, polyether ether ketone, polytetrafluoroethylene, polyvinylidene fluoride, poly(1-trimethylsilylpropyne), polydimethylsiloxane, polyvinyltrimethylsilane, poly(4-methyl pentene), ethyl cellulose, natural rubber, poly(2,6-dimethylphenylene oxide), low-density polyethylene, high-density polyethylene, styrene, polyethyl methacrylate, polycarbonate, polyester, aliphatic polyamide, polyvinyl alcohol, various polyethers such as polyethylene glycol, etc.; polymethacrylic acid; polymethylmethacrylate; various polymers of intrinsic microporosity (PIMs); various thermal rearranged polymers (TR polymers); and copolymers of those polymers.

It is preferable that the absolute value of a difference in solubility parameter (SP value) between the organic polymer and a substance to be separated is smaller. As the absolute value of the difference in solubility parameter between the organic polymer and the substance to be separated is smaller, the solubility of the substance to be separated is improved to improve the permeation rate. On the other hand, as the absolute value of the difference in solubility parameter between the organic polymer and the substance not to be separated is larger, the permeation rate is lowered. Therefore, the organic polymer layer may be selected appropriately in accordance with the kind of substance to be separated.

It is preferable that the organic polymer is a glass-like polymer which has high glass transition point (Tg) and high structural order, because spaces (free volume) among polymer chains can be controlled broadly. Meanwhile, when the glass transition point is high, the organic polymer is too brittle to be thinned easily. Therefore, the organic polymer is selected appropriately in accordance with an application or a manufacturing method of the fluid separation membrane.

It is preferable that the organic polymer layer contains, among those organic polymers, one or two or more kinds of organic polymers selected from aromatic polyimide, cellulose acetate, polysulfone, aromatic polyamide, polyether imide, polyether sulfone, polyacrylonitrile, polyphenylene sulfide, polyether ether ketone, polytetrafluoroethylene, polyvinylidene fluoride, and derivatives thereof.

Among them, aromatic polyimide, aromatic polyamide, and derivatives thereof are particularly preferred due to high separability of fluid, and excellent heat resistance, chemical resistance and mechanical strength.

In order to improve the permeation rate of fluid, various additives such as nanoparticles may be added to the organic polymer layer. Examples of such nanoparticles may include silica, titania, zeolite, metal oxides, and metal-organic frameworks (MOFs). In addition, a bulky substituent may be introduced into a molecule to increase the free volume in the organic polymer to improve the permeation rate.

On the other hand, in order to improve the fluid separation factor, a functional group or an additive which has chemically affinity to the substance to be separated may be introduced. Examples of such functional group with chemical affinity may include various polar functional groups such as an amino group, an amide group, a sulfo group, a carbonyl group, a phenolic hydroxyl group, etc. Examples of such additives may include ionic liquids, and alkali metal carbonates.

The thickness of the organic polymer layer can be set appropriately. As the thickness is reduced, the permeation rate of fluid is improved. Therefore, the thickness is preferably 5 μm or less, more preferably 3 μm or less, and even more preferably 1 μm or less. In the present specification, assume that the thickness of the organic polymer layer is an arithmetic average value of thicknesses at optional 20 places in a scanning electron microscopic image.

<Manufacturing Method of Fluid Separation Membrane>

The fluid separation membrane of the present invention can be manufactured by a manufacturing method including a step in which a carbonizable resin and an eliminable resin are brought into a compatibly mixed state to obtain a resin mixture (step 1), a step of spinning the resin mixture in a compatibly mixed state to undergo phase-separation (step 2), a step of carbonizing the resin mixture by heating and pyrolysis (step 3), and a step of forming an organic polymer layer on the surface (step 4).

[Step 1]

Step 1 is a step in which 10 to 90 weight % of the carbonizable resin and 90 to 10 weight % of the eliminable resin are brought into a compatibly mixed state to obtain a resin mixture.

Here, the carbonizable resin is a resin which carbonizes upon pyrolysis and remains as branches (carbon skeleton). Both a thermoplastic resin and a thermosetting resin can be used.

In the case of a thermoplastic resin, it is preferred to select a resin which can be rendered infusible by a simple process such as heating or irradiation with high-energy rays. In the case of a thermosetting resin, there are many cases where a treatment for imparting infusibility is unnecessary, and thermosetting resins also are included in suitable materials.

Examples of such thermoplastic resins may include polyphenylene ether, polyvinyl alcohol, polyacrylonitrile, phenolic resin, fully aromatic polyester, polyimide resin, cellulose acetate, and polyether imide. Examples of such thermosetting resins may include unsaturated polyester resin, alkyd resin, melamine resin, urea resin, polyimide resin, diallyl phthalate resin, lignin resin, urethane resin, polyfurfuryl alcohol resin, etc. These resins may be used either alone or in a mixed state. However, from the standpoint of ease of molding, it is also preferred to mix thermoplastic resins or mix thermosetting resins.

It is preferred to use thermoplastic resins among those from the standpoints of carbonization yield, spinning performance, and profitability. It is more preferred to use polyphenylene ether, polyvinyl alcohol, polyacrylonitrile, and fully aromatic polyester.

The molecular weight of the carbonizable resin is preferably 10,000 or more in weight-average molecular weight. When the weight-average molecular weight is 10,000 or more, fiber breakage can be reduced in the process of spinning. Meanwhile, the upper limit of the weight-average molecular weight is not limited particularly, however, it is preferably 1,000,000 or less in terms of spinning performance and easiness in resin extrusion.

The eliminable resin is a resin which can be removed subsequently to step 2, which will be described later, in any of the following stages: simultaneously with a treatment for imparting infusibility; after the treatment for imparting infusibility; and simultaneously with the pyrolysis.

Methods for removing the eliminable resin is not particularly limited, and it is preferred to use methods such as the following: a method in which the eliminable resin is chemically removed, for example, by conducting depolymerization using a chemical; a method in which the eliminable resin is dissolved away by adding a solvent capable of dissolving the eliminable resin; and a method in which the resin mixture is heated to lower the molecular weight of the eliminable resin by thermal decomposition, thereby removing the eliminable resin. These techniques can be used alone or in combination thereof. In the case of using a combination, the techniques may be simultaneously performed or separately performed As the chemically removing method, a method in which the resin is hydrolyzed using acid or alkali is preferred from the standpoint of profitability or handleability. Examples of resins which are susceptible to hydrolysis by acid or alkali may include polyester, polycarbonate, and polyamide.

Preferred examples of the method in which a solvent for dissolving the eliminable resin is added to remove the eliminable resin may include a method in which the solvent is continuously supplied to the carbonizable resin and the eliminable resin which have been mixed, thereby dissolving and removing the eliminable resin; a method in which the solvent and the resins are mixed batch wise to dissolve and remove the eliminable resin.

Specific examples of eliminable resins suitable for the method in which a solvent is added to remove the eliminable resins include polyolefins such as polyethylene, polypropylene or polystyrene, acrylic resins, methacrylic resins, polyvinyl pyrrolidone, aliphatic polyesters, and polycarbonates. Among them, it is more preferable that the eliminable resin is an amorphous resin from the standpoint of dissolubility in the solvent. Examples thereof include polystyrene, methacrylic resins, and polycarbonates.

An example of the method in which the eliminable resin is lowered in molecular weight by thermal decomposition and removed thereby include a method in which the carbonizable resin and eliminable resin that have been mixed are heated batch wise to thermally decompose the eliminable resin, or a method in which the carbonizable resin and the eliminable resin that have been continuously mixed are continuously supplied to a heating source and heated to thereby thermally decompose the eliminable resin.

It is preferable that the eliminable resin is a resin which disappears in step 3 which will be described later, through thermal decomposition when the carbonizable resin is carbonized by pyrolysis. It is preferable that the eliminable resin is a thermoplastic resin that does not undergo a large chemical change when the carbonizable resin is subjected to the treatment for imparting infusibility, which will be described later, and that, through pyrolysis, gives a carbonization yield less than 10%.

Specific examples of such eliminable resins may include polyolefin such as polyethylene, polypropylene or polystyrene, acrylic resins, methacrylic resins, polyacetal, polyvinyl pyrrolidone, aliphatic polyesters, aromatic polyesters, aliphatic polyamide, polycarbonates. These resins may be used either alone or in a mixed state.

In step 1, the carbonizable resin and the eliminable resin are brought into a compatibly mixed state to obtain a resin mixture (polymer alloy). Here, "brought into a compatibly mixed state" means that by suitably selecting conditions regarding temperature and/or solvent, a state that no structure in which the carbonizable resin and the eliminable resin are present as separate phases is observed with an optical microscope, is produced.

The carbonizable resin and the eliminable resin may be brought into a compatibly mixed state by mixing the resins alone with each other, or by further adding a solvent thereto.

Examples of a system in which a plurality of resins are have been brought into a compatibly mixed state include a system which shows a phase diagram of the upper critical solution temperature (UCST) type in which the resins are in a phase-separated state at a low temperature but form a single phase at high temperatures, or a system which conversely shows a phase diagram of the lower-limit critical solution temperature (LCST) type in which the resins are phase-separated state at high temperatures but form a single phase at low temperatures.

Furthermore, especially in the case of a system in which at least one of the carbonizable resin and the eliminable resin has been dissolved in a solvent, preferred examples include one in which the phase separation, which will be described later, is induced by infiltration of a nonsolvent.

The solvent to be added is not particularly limited, but preferred is such a solvent that the absolute value of the difference from an average value of the solubility parameters (SP value) of the carbonizable resin and the eliminable resin, which is an index of solubility, is preferably within 5.0.

It has been known that solubility is higher as the absolute value of the difference from the average value of the SP values is smaller. Therefore, it is preferable that there is no difference. In addition, as the absolute value of the difference from the average value of the SP values is larger, the solubility is reduced so that it is more difficult to attain the compatibly mixed state of the carbonizable resin and the eliminable resin. Therefore, the absolute value of the difference from the average value of the SP values is preferably 3.0 or less, and more preferably 2.0 or less.

Specific examples of combinations of the carbonizable resin and the eliminable resin to be brought into a compatibly mixed state, in the case the system contains no solvent, include polyphenylene ether/polystyrene, polyphenylene ether/styrene-acrylonitrile copolymer, fully aromatic polyester/polyethylene terephthalate, fully aromatic polyester/polyethylene naphthalate, fully aromatic polyester/polycarbonate.

Specific examples of combinations, in the case where the system contains a solvent include polyacrylonitrile/polyvinyl alcohol, polyacrylonitrile/polyvinyl phenol, polyacrylonitrile/polyvinyl pyrrolidone, polyacrylonitrile/polylactic acid, polyvinyl alcohol/vinyl acetate-vinyl alcohol copolymer, polyvinyl alcohol/polyethylene glycol, polyvinyl alcohol/polypropylene glycol, polyvinyl alcohol/starch.

Methods for mixing the carbonizable resin and the eliminable resin are not limited, and various known mixing techniques may be used so long as even mixing is possible therewith. Specific examples may include a rotary type mixer with stirring blades, a kneading extruder using screws, etc.

It is also preferable that the temperature (mixing temperature) at which the carbonizable resin and the eliminable resin are mixed together is not lower than a temperature at which both the carbonizable resin and the eliminable resin soften. Here, as the temperature at which the resins soften, either the melting point of the carbonizable resin or eliminable resin in the case where the resin is a crystalline polymer or the glass transition temperature thereof in the case where the resin is an amorphous resin may be suitably selected.

By setting the mixing temperature at a temperature not lower than the temperature at which both the carbonizable resin and the eliminable resin soften, the viscosities of the two resins can be lowered and, hence, more efficient stirring and mixing are possible. There is no particular upper limit on the mixing temperature, but it is preferably 400° C. or lower from the standpoint of preventing resins deterioration due to thermal decomposition, and thereby obtaining a precursor of the porous carbon fiber having excellent quality.

In addition, in step 1, 90 to 10 weight % of the eliminable resin is mixed with 10 to 90 weight % of the carbonizable resin. In cases when the proportions of the carbonizable resin and the eliminable resin are within those ranges, the optimal pore size and an optimal porosity can be arbitrarily designed.

So long as the proportion of the carbonizable resin is 10 weight % or more, not only it is possible that mechanical strength of the porous carbon fiber after carbonization can be maintained, and but also an improved yield results; such proportions are hence preferred. Meanwhile, so long as the proportion of the carbonizable resin is 90 weight % or less, the eliminable resin can efficiently form voids; such proportions are hence preferred.

A mixing ratio between the carbonizable resin and the eliminable resin can be arbitrarily selected within the ranges while taking account of the compatibility of each material. Specifically, since compatibility between resins generally becomes worse as the ratio therebetween approaches 1:1, preferred embodiments in the case where a system having not so high compatibility has been selected as starting materials include one in which the compatibility is improved by making the mixture approach to a so-called partial composition by increasing or reducing the amount of the carbonizable resin.

It is also preferred to add a solvent when the carbonizable resin and the eliminable resin are mixed. The addition of the solvent not only lowers the viscosities of the carbonizable resin and the eliminable resin to facilitate molding, but also renders the carbonizable resin and the eliminable resin easy to bring into a compatibly mixed state.

The solvent here is also not particularly limited, and any solvent which is liquid at a normal temperature and in which at least one of the carbonizable resin and the eliminable resin is soluble or swellable may be used. A solvent in which both the carbonizable resin and the eliminable resin dissolve is more preferred because the compatibility between both resins can be improved.

It is preferable that the amount of the solvent to be added is 20 weight % or more based on the total weight of the carbonizable resin and the eliminable resin, from the standpoint of improving the compatibility between the carbonizable resin and the eliminable resin and lowering the viscosities thereof to improve the flowability. Meanwhile, from the standpoint of the cost of the recovery and recycling of the solvent, the addition amount thereof is preferably 90 weight % or less based on the total weight of the carbonizable resin and the eliminable resin.

[Step 2]

Step 2 is a step in which the resin mixture that has been brought into a compatibly mixed state in step 1 is spun to form a phase-separated micro structure.

A method for spinning the resin mixture that has been brought into a compatibly mixed state is not particularly limited, and a spinning method may be suitably selected in accordance with a phase separation method, which will be described later. In the case where the resin mixture is a combination of thermoplastic resins, the resin mixture may be heated to at least the softening temperature of the resins before melt spinning is performed. In the case where the resin mixture contains a solvent, dry spinning, dry-wet spinning, wet spinning, etc. may be suitably selected as solution spinning.

The melt spinning is a method in which a resin mixture heated and melted (flowable state) using a kneading extruder or the like is extruded from a spinneret, and wound while being cooled, thereby the resin mixture being formed into fiber. The process speed of the melt spinning is higher than that of the solution spinning and, hence, the melt spinning has excellent productivity. In addition, volatilization of the solvent does not occur and, hence, expenses for safety measures during the process can be reduced. Therefore, the melt spinning is preferred because manufacturing can be attained at a low cost.

Meanwhile, the solution spinning is a method in which a spinning dope consisting of a resin mixture and a solvent, which have been adjusted in advance, is measured, and extruded from a spinneret, thereby the dope being formed into fiber. The phase separated state can be controlled minutely. Particularly for dry-wet spinning or wet spinning using a coagulation bath, the phase separated state of precursor fiber can be controlled minutely in suitable combination of heat induction phase separation, nonsolvent induction phase separation, etc. Thus, the solution spinning is a more preferable embodiment.

Methods by which the carbonizable resin and eliminable resin that have been mixed together are caused to undergo phase separation are not particularly limited. Examples of such methods include a heat-induction phase separation method in which phase separation is induced by a temperature change; a nonsolvent-induction phase separation method in which phase separation is induced by adding a nonsolvent.

These phase separation methods may be used alone, or in combination thereof. Specific examples of methods in the case of using a combination include a method in which the mixture is passed through a coagulating bath to cause nonsolvent-induced phase separation and is then heated to cause heat-induced phase separation; a method in which nonsolvent-induced phase separation and heat-induced phase separation are simultaneously caused by controlling the temperature of a coagulating bath; a method in which the material ejected from a spinneret is cooled to cause heat-induced phase separation, and is then brought into contact with a nonsolvent.

Further, the resin mixture passed through the coagulation bath is then dried to form a microstructure. Thus, a precursor of the porous carbon fiber can be obtained. Here, coagulating liquid is not particularly limited. Examples of such coagulating liquid include water, ethanol, saturated saline water, a mixed solvent composed of any of these and the solvent used in step 1.

In the nonsolvent-induction phase separation, in order to prevent formation of a dense layer in the periphery of the fiber a composite spinning method in which a spinning solution is ejected from an inner tube, and a solution having the same solution as the spinning solution and the eliminable resin dissolved therein is ejected from an outer tube simultaneously may be used. Thus, a precursor of the porous carbon fiber of the present invention can be manufactured.

(Removal of the Eliminable Resin)

It is preferable that the precursor of the porous carbon fiber obtained in step 2 is subjected to a treatment for removing the eliminable resin, before the precursor is subjected to the carbonization step (step 3) and/or simultaneously with the carbonization step (Step 3).

Methods for the removal treatment are not particularly limited. Examples include a method in which the eliminable resin is chemically decomposed and lowered in molecular weight using an acid, alkali, or enzyme and is removed thereby; a method in which the eliminable resin is dissolved away with a solvent capable of dissolving the eliminable resin; a method in which the eliminable resin is decomposed and removed using radiation, such as electron beams, gamma rays, ultraviolet rays or infrared rays, or heat.

Particularly in the case where the eliminable resin can be removed through thermal decomposition, use can be made of: a method in which a heat treatment is performed beforehand at a temperature at which 80 weight % or more of the eliminable resin disappears; or a method in which the eliminable resin is gasified by thermal decomposition and removed in the carbonization step (step 3) or in the treatment for imparting infusibility which will be described later. The method in which the eliminable resin is gasified by thermal decomposition and removed simultaneously with a heat treatment in the carbonization step (step 3) or in the treatment for imparting infusibility which will be described below is preferred because the production efficiency is heightened.

(Treatment for Imparting Infusibility)

It is preferable that the precursor of the porous carbon fiber is subjected to a treatment for imparting infusibility, before being subjected to the carbonization step (step 3).

Methods for the treatment for imparting infusibility are not particularly limited, and known methods can be used. Specific examples of such methods include a method in which the precursor is heated in the presence of oxygen to thereby cause oxidative crosslinking; a method in which the precursor is irradiated with high-energy rays such as electron beams or gamma rays to form a crosslinked structure; a method in which a substance having a reactive group is immersed or mixed to form a crosslinked structure. Among them, the method in which the precursor is heated in the presence of oxygen to thereby cause oxidative crosslinking is preferred because the process is simple and the production cost can be reduced. These methods may be used alone or in combination thereof. The methods may be used either simultaneously or separately.

The heating temperature in the method in which the precursor is heated in the presence of oxygen to thereby cause oxidative crosslinking is preferably 150° C. or higher from the standpoint of causing the crosslinking reaction to proceed efficiently, but is preferably 350° C. or lower from the standpoint of preventing the yield from being impaired by a weight loss due to thermal decomposition, combustion, and so on of the carbonizable resin.

The oxygen concentration during the treatment is not particularly limited. However, to supply a gas having an oxygen concentration of 18% or higher is preferred because use of such gas makes it possible to reduce the production cost. Methods for supplying the gas are not particularly limited, and examples thereof include a method in which air is supplied as such to the heating device and a method in which pure oxygen is supplied to the heating device using, for example, a cylinder device.

Examples in which the precursor is irradiated with high-energy rays such as electron beams or gamma rays to form a crosslinked structure include a method in which a commercial device such as an electron beam generator or gamma ray generator is used to irradiate the carbonizable resin with electron beams or gamma rays to thereby induce crosslinking.

The lower limit of irradiation intensity is preferably 1 kGy or higher from the standpoint of efficiently introducing a crosslinking structure efficiently by the irradiation, and the irradiation intensity is preferably 1,000 kGy or less from the standpoint of preventing the strength of the porous carbon fiber from being reduced by a decrease in molecular weight due to cleavage of the main chain.

Examples of the method in which a substance having a reactive group is immersed or mixed to form a crosslinked structure include a method in which a low molecular weight compound having a reactive group is immersed into the resin mixture, and heated or irradiated with high energy rays to cause a crosslinking reaction to proceed; and a method in which a low molecular weight compound having a reactive group is mixed in advance, and heated or irradiated with high energy rays to cause a crosslinking reaction to proceed.

[Step 3]

Step 3 is a step in which the precursor of the porous carbon fiber obtained in step 2, or the precursor which, according to need, has undergone the removal of the eliminable resin and/or the infusibilizing treatment, is pyrolyzed and carbonized to obtain the porous carbon fiber.

In order to carbonize the precursor of the porous carbon fiber, it is preferable that the pyrolysis is conducted by heating in an inert gas atmosphere.

The inert gas herein is a gas which is chemically inert during the heating. Specific examples of such gases include helium, neon, nitrogen, argon, krypton and xenon. Among these, it is preferred to use nitrogen or argon from the standpoint of profitability. When the carbonizing temperature is set at 1,500° C. or more, it is preferred to use argon from the standpoint of prevention of formation of nitrides.

The flow rate of the inert gas may be any rate as long as the oxygen concentration in the atmosphere within the heating device can be sufficiently lowered. It is preferred to suitably select an optimum value in accordance with the size of the heating device, the supplied amount of a raw material, the heating temperature, etc.

Although, the upper limit of the flow rate is not particularly limited, it is preferred to suitably set the flow rate in accordance with a temperature distribution or the design of the heating device from the standpoints of profitability and of reducing temperature differences within the heating device.

It is more preferred that gas generated during the carbonization can be discharged sufficiently to the outside of the system because the porous carbon fiber can be obtained with excellent quality. To this end, it is preferred that the flow rate of the inert gas is set so that the gas concentration generated inside the system is reduced to 3,000 ppm or less.

When a small amount of active gas is introduced together with the aforementioned inert gas, the surface of the porous carbon fiber can be chemically etched so that the pore diameter in the surface of the porous carbon fiber can be controlled. Oxygen, carbon dioxide, water vapor, air, or combustion gas can be used as the active gas.

The heating temperature is not particularly limited as long as it exceeds the temperature at which the eliminable resin can be thermally decomposed, but the heating temperature is preferably 300° C. or more, and more preferably 400° C. or higher. Meanwhile, though the upper limit of the heating temperature is not limited, from the standpoint of profitability, it is preferred that the heating temperature is 1,500° C. or lower because it is not necessary to perform any special processing on equipment.

With respect to heating methods in the case where the carbonization treatment is continuously performed, a method in which the porous carbon fiber is continuously fed to and taken out from the heating device kept at a constant temperature, using rollers, conveyor or the like is preferred because the productivity can be enhanced.

In the case where a batch treatment is conducted in a heating device, there is no particular limit on the temperature increase rate or the temperature decrease rate. However, rates of 1° C./min or higher are preferred because the time period required for the heating and cooling can be shortened to thereby heighten the productivity. There is no particular upper limit of the heating rate or cooling rate. The upper limit may be set suitably within a range causing no defect such as cracking.

In addition, it is possible to set the time of retaining the carbonizing temperature desirably. When the retention time is long, it is inclined that the shrinkage of the porous carbon fiber proceeds and, hence, the pore diameter in the surface of the fiber becomes smaller.

[Step 4]

Step 4 is a step in which an organic polymer layer is formed on the surface of the porous carbon fiber manufactured in Step 3.

A method for forming the organic polymer layer is not limited particularly. The method is typically a method in which the surface of the porous carbon fiber is coated with the organic polymer itself. However, a method in which the porous carbon fiber is coated with a precursor of the organic polymer and the precursor is then formed into the organic polymer by reaction may be used.

The coating method of the organic polymer or the precursor of the organic polymer include a dip coat method, a spray method, or a vapor deposition method may be used as. Particularly the dip coat method is preferred because of its relatively easy manufacturing method.

The dip coat method is roughly classified into a melt method and a solution method. In the melt method, the organic polymer or the precursor thereof is melt and deposited at a temperature not lower than its melting point, and then cooled down to a temperature not higher than the melting point. Thus, a fluid separation membrane is manufactured. On the other hand, in the solution method, the organic polymer or the precursor thereof is dissolved in a solvent in which the organic polymer or the precursor can be dissolved. After being deposited, the organic polymer or the precursor is dried suitably to remove the solvent. Thus, a fluid separation membrane is manufactured. In either method, additives may be added in order to improve a function such as the permeation rate or the separation performance of fluid.

When the dip coat method is used, the viscosity of coating solution may be selected suitably in accordance with conditions such as the surface roughness of the porous carbon support, the coating rate, a desired membrane thickness, etc. The higher the viscosity of the coating solution is, the more uniformly the organic polymer layer can be formed. Therefore, the viscosity is preferably 10 mPa·s or higher, and more preferably 50 mPa·s or higher. Meanwhile, the lower the viscosity of the coating solution is, the thinner the membrane is and the faster the permeation rate is. Therefore, the shear viscosity is preferably 1,000 mPa·s or lower and more preferably 800 mPa·s or lower at a shear rate of 0.1 s$^{-1}$.

When an organic polymer precursor is used, a reaction method may be selected suitably in accordance with the kind of the precursor. The organic polymer precursor undergoes polymerization, cyclization and crosslinking reaction, which are accelerated by heating or using a catalyst, the fluid separation membrane of the present invention is manufactured.

In addition, in order to improve the adhesion between the porous carbon fiber and the organic polymer layer, a surface treatment may be conducted on the porous carbon fiber before the organic polymer layer is formed. The surface treatment includes an oxidation treatment and a chemical liquid coating treatment. Examples of the oxidation treatment include a chemical liquid oxidation method using nitric acid, an electrolytic oxidation method, a vapor phase oxidation method.

The chemical liquid coating treatment includes addition of a sizing agent. Such a surface treatment makes wettability better and improves the adhesion to the organic polymer layer. Thus, the compression strength of the fluid separation membrane can be further improved.

<Fluid Separation Membrane Module>

The fluid separation membrane module of the present invention includes a plurality of fluid separation membranes of the present invention which are housed in a casing.

When fluid separation is practically conducted using the fluid separation membranes of the present invention, a plurality of fluid separation membranes are connected and housed in a casing to make a fluid separation membrane module to be used.

EXAMPLES

Preferred examples of the present invention will be described below. Those examples are not intended to limit the present invention. "Parts" in the examples may be "parts by weight".

[Evaluation Procedure]

(Presence or Absence of Co-Continuous Porous Structure)

The fluid separation membrane or the porous carbon fiber was sufficiently cooled in liquid nitrogen, and then cut with tweezers, and a porous carbon fiber portion of the resultant cut surface was examined with a scanning electron microscope. In cases when a structure in which carbon-skeleton branches and pores (voids) had been respectively interconnected and had been regularly intertwined with each other three-dimensionally was observed, this fluid separation membrane or the porous carbon fiber was deemed to have a co-continuous porous structure.

(Compression Strength, Bulk Density and Compression Ratio Strength of Fluid Separation Membrane)

The compression strength of the fluid separation membrane was measured using a microcompression tester MCTW-500 manufactured by Shimadzu Corporation, as follows. One porous carbon fiber was held by jigs and compressed in a cross-sectional direction of the fiber using a flat indenter made of diamond and having a diameter of φ500 μm at a loading speed of 41.482 mN/s based on a fixed loading rate system to measure the compression displacements and the loads. Compression strength σ was calculated by the following equation.

$$\sigma = \frac{2F}{\pi \cdot d \cdot l}$$ [Equation 3]

σ: compression strength in cross-sectional direction of fiber, F: breaking load, d: fiber diameter, l: fiber length The compression ratio strength was calculated by dividing the compression strength by the average bulk density.

The average bulk density was measured as follows. Images of the fluid separation membrane were taken at any 20 sites in the cross-section of the fluid separation membrane by the scanning electron microscope. Cross-sectional areas at the 20 sites were calculated by image processing, and an average cross-sectional area was obtained. Successively the bulk density was calculated by the following equation. Bulk densities in 20 fluid separation membranes were measured, and an average value thereof was taken as the average bulk density of the fluid separation membrane.

$$\rho_b = \frac{W}{S \cdot l} \quad \text{[Equation 4]}$$

$\rho_b$: bulk density of fluid separation membrane, W: weight of fluid separation membrane, S: average cross-sectional area, l: fiber length (Structural Period)

The porous carbon fiber was fixed to a specimen plate, and positions of a CuK α-ray source, the specimen and a two-dimensional detector were adjusted so that information on scattering angles less than 10 could be obtained from the X-ray source obtained from a CuK α-ray source. From image data (luminance data) obtained from the two-dimensional detector, the data on the central portion which had been affected by the beam stopper were excluded. Moving radius from a beam center was set, and for the range of 360° at angular intervals of 1° were summed up to obtain a scattering intensity distribution curve. Based on the scattering angle 2θ corresponding to the position of a peak in the obtained curve, the structural period of interconnected-structure portion was obtained using the following equation.

$$L = \frac{\lambda}{2 \sin \theta} \quad \text{[Equation 5]}$$

structural period: L, λ: wavelength of incident X-rays

When the X-ray scattering at the small angle could not be observed, the porous carbon fiber was tomographically photographed by X-ray CT, and three-dimensional images obtained thus were subjected to Fourier-transformation, the resultant two-dimensional spectrum was processed by circular averaging to obtain a one-dimensional spectrum. A characteristic wavelength corresponding to the position of a peak top in the one-dimensional spectrum was determined, and the structural period was calculated as the inverse of the characteristic wavelength.

(Half-Value Width of Intensity Peak of X-Ray Scattering)

In the scattering intensity distribution curve consisting of the scattering angle 2θ (abscissa) and the scattering intensity (ordinate) obtained by the aforementioned X-ray scattering, the vertex of the peak is called point A, and a straight line parallel with the ordinate of the graph is drawn from point A. The intersection of the straight line and the base line of the spectrum is called point B, and the width of the peak as measured at the center (point C) of the segment that connects point A and point B is taken as the half-value width.

(Average Porosity)

The porous carbon fiber was embedded in a resin, and a cross-section of the fiber was then exposed by a razor blade or the like. Using a cross-section polisher SM-09010 manufactured by JEOL Ltd., argon ion beam was irradiated to the specimen surface at an acceleration voltage of 5.5 kV to etch the surface.

A central part of the resultant cross-section of the fiber was examined with a scanning microscope S-5500 manufactured by Hitachi High-Technologies Corporation, at such a magnification as to result in 1±0.1 (nm/pixel) and at a resolution of 700,000 pixels or higher, and a square region in the fiber cross-section which was necessary for calculation and in which each side thereof had 512 pixels was set on the image obtained through the microscopic examination. The area of the pores and the area of carbon were expressed by A and B, respectively, and the porosity was determined using the following equation. An average porosity was calculated by obtaining an arithmetic average of any 20 sites within the cross-section.

Here, in cases where the porous carbon fiber had a hollow portion, the average porosity was calculated excluding the void of the hollow portion.

Average porosity (%)=$A/B$×100

(Average Pore Diameter of Porous Carbon Fiber as a Whole)

The porous carbon fiber was vacuum-dried on conditions of 300° C. for 5 hours to remove adsorbed gas components. Thereafter, a pore diameter distribution curve was acquired by a mercury intrusion method using an automatic porosimeter (Autopore IV 9500) manufactured by Shimadzu Corporation.

(Fiber Diameter D)

20 porous carbon fibers were measured by a micrometer, and an arithmetic average value thereof was taken as a fiber diameter D.

(Average Pore Diameter in Surface of Porous Carbon Fiber)

Using the scanning electron microscope S-5500 manufactured by Hitachi High-Technologies Corporation, an image acquired by observing a surface of the porous carbon fiber at such a magnification as to result in 1±0.1 (nm/pixel) and at a resolution of 700,000 pixels or higher, was analyzed by image analysis software "Image)". The fiber surface was separated into branches (carbons) and pores (voids).

Subsequently the average value of areas of the pores in the image was calculated, and a diameter of a perfect circle having the same area as the average area was taken as an average pore diameter. When the number of pores observed in the image was less than 10, the average pore diameter was calculated using an image acquired by observation with 700,000 pixels or more at a magnification of 10±1 (nm/pixel).

(Bending Radius)

The fluid separation membrane was wound over 180° or more around each of columns having various diameters, and was observed as to whether the membrane was broken or not. The columns which was the smallest in radius among the columns that did not cause a membrane break was determined and the bending radius was expressed in terms of radius of that column.

(Measurement of Gas Permeation Rate)

20 fluid separation membranes, each 10 cm long, were bundled and housed in a stainless steel casing having an outer diameter of ϕ6 mm and a thickness of 1 mm. Ends of the bundled fluid separation membranes were fixed to the inner surface of the casing by an epoxy resin based bonding agent, and both ends of the casing were sealed off to prepare a fluid separation membrane module, and a gas permeation rate of the module was measured.

Carbon dioxide and methane were used as measuring gas. Pressure changes of carbon dioxide and methane on the permeation side per unit time were measured in an external pressure system at a measuring temperature of 25° C. of a pressure sensor method of JIS J7126-1(2006). Here, the difference in pressure between the supply side and the permeation side was set at 0.11 MPa (82.5 cmHg).

Subsequently, a permeation rate Q of permeated gas was calculated by the following equation, and a separation factor α was calculated as a ratio between permeation rates of the respective gas components. STP herein means standard conditions.

In addition, the membrane area was calculated from the outer diameter and the length of the fluid separation membrane in a region which contributes to the permeation of the gas.

Permeation rate $Q$=[gas permeation flow rate $(cm^3 \cdot STP)$]/[membrane area $(cm^2) \times$ time $(s) \times$ pressure difference (cmHg)]

[Preparation Example 1] Preparation of 10 Weight % Aromatic Polyimide Solution

Aromatic polyimide "Matrimid (registered trademark)" 5218 was dissolved in N-methylpyrrolidone (NMP) to prepare a 10.0 weight % aromatic polyimide solution.

Here, the "Matrimid (registered trademark)" 5218 was a condensation product of 3,3',4,4'-benzophenonetetracarboxylic dianhydride and 5(6)-amino-1-(4'-aminophenyl)-1,3,3'-trimethylindane.

[Preparation Example 2] Preparation of 25 Weight % Aromatic Polyimide Solution

Aromatic polyimide "Matrimid (registered trademark)" 5218 was dissolved in N-methylpyrrolidone (NMP) to prepare a 25.0 weight % aromatic polyimide solution was prepared.

Example 1

70 g of polyacrylonitrile (MW 150,000) manufactured by Polysciences, Inc., 70 g of polyvinyl pyrrolidone (MW 40,000) manufactured by Sigma-Aldrich Co. LLC, and 400 g of dimethyl sulfoxide (DMSO) manufactured by Wakenyaku Co., Ltd. as a solvent were put into a separable flask, to prepare a uniform and transparent solution at 150° C. while being stirred and refluxed for three hours. The concentration of polyacrylonitrile and the concentration of polyvinyl pyrrolidone then were 10 weight % respectively.

The polymer solution obtained thus was cooled down to 25° C. Thereafter, the polymer solution was ejected at 3 mL/min from an inner tube of a sheath/core type double-tube spinneret, and a DMSO 90 weight % aqueous solution was ejected simultaneously at 5.3 mL/min from an outer tube of the spinneret. Then, the ejected solutions were introduced into a coagulation bath containing pure water at 25° C., then taken off at a rate of 5 m/min, and taken up around a roller. Thus, raw fibers were obtained. In this operation, the air gap was set at 5 mm, and the immersion length in the coagulation bath was set at 15 cm.

The obtained raw fibers were translucent, and had undergone phase separation. The obtained raw fibers were washed with water, and then dried at 25° C. for 24 hours in a circulation type dryer. Thus, a dried raw fibers were produced.

Thereafter, the dried raw fibers were introduced into an electric furnace at 250° C., and heated for 1 hour in an oxygen atmosphere, thereby an infusibilizing treatment being performed.

Subsequently, the infusibilized raw fibers were subjected to a carbonization treatment under the conditions of a nitrogen flow rate of 1 L/min, a temperature increase rate of 10° C./min, an end-point temperature of 500° C., and a retention time of 1 minute, thereby obtaining porous carbon fiber.

When a cross-section of the obtained porous carbon fiber was observed, a co-continuous porous structure was observed. In addition, the porous carbon fiber was photographed by X-ray CT, and a structural period was calculated. The structural period was 1,580 nm.

Further, a porous carbon fiber of 10 cm long was immersed into the aromatic polyimide solution prepared in Preparation Example 1. Thereafter, the porous carbon fiber was pulled up at a rate of 10 mm/min. Subsequently, the porous carbon fiber was immersed into water to remove the solvent, and dried at 50° C. for 24 hours. Thus, a fluid separation membrane in which aromatic polyimide has been deposited on the porous carbon fiber was produced.

Example 2

A porous carbon fiber was produced in the same manner as in Example 1, except that spinning was performed using a polymer solution having 11.5 weight % of polyacrylonitrile and 11.5 weight % of polyvinyl pyrrolidone.

Example 3

A porous carbon fiber was produced in the same manner as in Example 1, except that spinning was performed using a polymer solution having 13 weight % of polyacrylonitrile and 13 weight % of polyvinyl pyrrolidone, and the end-point temperature was set at 700° C.

Example 4

Porous carbon fiber was produced in the same manner as in Example 1, except that spinning was performed by ejecting the solution at 5 mL/min from the inner tube of the sheath/core type double-tube spinneret, and simultaneously ejecting the DMSO 90 weight % aqueous solution at 8.8 mL/min from the outer tube of the spinneret.

Example 5

Porous carbon fiber was produced in the same manner as in Example 1, except that a sheath/core type triple-tube spinneret was used to eject a DMSO 85 weight % aqueous solution at 1 mL/min from an inner tube, eject the polymer solution at 3 mL/min from a middle tube, and eject the DMSO 90 weight % aqueous solution at 5.3 mL/min from an outer tube, so as to produce a hollow fiber-like porous carbon fiber.

Example 6

Porous carbon fiber was produced in the same manner as in Example 1, except that spinning was performed using a spinneret with a single hole of ϕ0.6 mm, and using a polymer solution having 10 weight % of polyacrylonitrile and 10 weight % of polyvinyl pyrrolidone. A dense layer was formed on the surface of the obtained porous carbon fiber, and no pore could be confirmed.

Comparative Example 1

1 part of cyclohexanone peroxide (PEROXA-H, manufactured by NOF Corporation) was dissolved in 100 parts of methyl methacrylate (hereinafter abbreviated as MMA), and 800 parts of pure water and 1 part of PELEX OTP (manufactured by NOF Corporation) as emulsifier were added to a reaction tank. After replacement with inert gas was performed sufficiently, the solution obtained thus was kept at 40° C., and adjusted to pH3 by 0.76 parts of Rongalite and a sulfuric acid aqueous solution. After that, polymerization was initiated. While the solution was still stirred as it is, a first stage of emulsion polymerization was completed in 150 minutes.

Next, 72 parts of acrylonitrile (hereinafter abbreviated as AN) was added to the emulsion, the temperature thereof was increased to 70° C., and it was continuously stirred again for 150 minutes. 4 parts of sodium sulfate was further added to the emulsion, and that was stirred for 30 minutes to complete the polymerization. The resulting polymer was taken out, filtrated, washed with water, and dried to prepare MMA/NA block copolymer (compatibilizer) (C) having a polymerization degree of 65.7% and a specific viscosity of 0.19.

Subsequently, 60 parts of AN/MMA copolymer (A) which is composed of 98 mol % of AN and 2 mol % of methacrylic acid (hereinafter abbreviated as MAA) and has a specific viscosity of 0.24, 40 parts of MMA/MA copolymer (B) which is composed of 99 mol % of MMA and 1 mol % of methyl acrylate (hereinafter abbreviated as MA) and has a specific viscosity of 0.21, 3 parts of the compatibilizer (C) prepared in the aforementioned method, and dimethylformamide as a solvent (D) were added to make the polymer concentration to 26% by weight.

Subsequently, the air was ejected at 0.098 kPa from an inner tube of a sheath/core type double-tube spinneret, and the polymer solution obtained thus was simultaneously ejected at 3 mL/min from an outer tube of the spinneret. The ejected solutions were then introduced into a coagulation bath containing pure water at 25° C., then taken back at a rate of 5 m/min, and taken up around a roller. Thus, raw fibers were obtained.

In this operation, an air gap was set at 5 mm, and the immersion length in the coagulation bath was set at 15 cm. The obtained raw fibers were washed with water, and then dried at 25° C. for 24 hours in a circulation type dryer to produce dried raw fibers.

The obtained raw fibers had undergone an infusibilizing treatment and a carbonization treatment in the same manner as in Example 1 to prepare a hollow fiber-like porous carbon fiber.

A cross-section of the obtained porous carbon fiber was observed. Although extended (connected) pores could be observed partially, a large number of independent pores were observed. In addition, small angle X-ray scattering was measured and photographing of X-ray CT were taken. No peak could not be observed in scattering intensity.

Comparative Example 2

The aromatic polyimide solution prepared in Preparation Example 2 was heated to 50° C. Pure water was ejected at 4 mL/min from an inner tube of a sheath/core type double-tube spinneret, and the aromatic polyimide solution was simultaneously ejected at 8 mL/min from an outer tube of the spinneret. Thereafter, the solutions were introduced into a coagulation bath containing pure water at 25° C., and taken up around a roller to obtain raw fibers.

In this operation, an air gap was set at 200 mm, and the immersion length in the coagulation bath was set at 15 cm. The obtained raw fibers were washed with water, and then dried at 50° C. for 24 hours to prepare an aromatic polyimide hollow fiber membrane. A cross-section of the obtained hollow fiber membrane was observed. Pores were independent of one another. The surface of the membrane was dense, and no pores were observed. The membrane thickness was 5.5 μm.

In addition, measurement of small angle X-ray scattering and photographing of X-ray CT were performed. No peak could not be observed in scattering intensity. An organic polymer layer was not newly formed on the hollow fiber membrane, and a permeation rate of gas was measured.

Configurations of fluid separation membranes produced in Examples and Comparative Examples and various evaluation results are shown in Table 1.

TABLE 1

| | | fluid separation membrane | | | | | | | |
|---|---|---|---|---|---|---|---|---|---|
| | | substrate | | | | | | | organic polymer layer |
| unit | kind | diameter (outer diameter) μm | hollow area ratio — | co-continuous porous structure — | structural period nm | half-value width of intensity peak of X-ray scattering * | average porosity % | average pore diameter as a whole nm | average pore diameter in surface nm | kind of organic polymer |
| Example 1 | carbon fiber | 230 | 0 | yes | 1580 | 0.04 | 55 | 710 | 220 | aromatic polyimide |
| Example 2 | carbon fiber | 240 | 0 | yes | 1220 | 0.05 | 58 | 550 | 180 | aromatic polyimide |
| Example 3 | carbon fiber | 230 | 0 | yes | 720 | 0.05 | 53 | 370 | 120 | aromatic polyimide |
| Example 4 | carbon fiber | 300 | 0 | yes | 1330 | 0.03 | 48 | 680 | 160 | aromatic polyimide |
| Example 5 | carbon fiber | 260 | 0.42 | yes | 1380 | 0.06 | 53 | 630 | 200 | aromatic polyimide |
| Example 6 | carbon fiber | 250 | 0 | yes | 950 | 0.05 | 49 | 420 | 0 | aromatic polyimide |

TABLE 1-continued

| | | | | | | | | | | |
|---|---|---|---|---|---|---|---|---|---|---|
| Comp. Ex. 1 | carbon fiber | 250 | 0.54 | no | — | — | 50 | 250 | 40 | aromatic polyimide |
| Comp. Ex. 2 | aromatic polyimide | 240 | 0.56 | no | — | — | 36 | 1580 | 0 | — |

| | | fluid separation membrane | | | | | fluid separation membrane module | | |
|---|---|---|---|---|---|---|---|---|---|
| | | organic polymer | | compression | | | | gas permeation rate | separation |
| | unit | layer thickness μm | compression strength MPa | bulk density g/cm$^3$ | ratio strength N·m/g | bending radius mm | $CO_2$ ×10$^{-6}$ cm$^3$-(STP)/cm$^2$·s·cmHg | $CH_4$ | factor $CO_2/CH_4$ — |
| Example 1 | | 1.3 | 31.5 | 1.15 | 27.4 | 6 | 10.4 | 0.33 | 31.5 |
| Example 2 | | 1.4 | 30.3 | 1.07 | 28.3 | 8 | 7.0 | 0.24 | 29.2 |
| Example 3 | | 1.3 | 34.2 | 1.12 | 30.5 | 5 | 3.6 | 0.18 | 20.0 |
| Example 4 | | 1.2 | 22.9 | 1.05 | 21.8 | 12 | 12.8 | 0.65 | 19.7 |
| Example 5 | | 1.7 | 15.5 | 0.67 | 23.1 | 10 | 16.6 | 0.41 | 40.5 |
| Example 6 | | 0.8 | 34.8 | 1.18 | 29.5 | 6 | 0.5 | 0.01 | 50.0 |
| Comp. Ex. 1 | | 0.7 | 8.3 | 0.51 | 16.3 | 15 | 0.8 | 0.08 | 10.0 |
| Comp. Ex. 2 | | — | 7.5 | 0.44 | 17.0 | 2 | 7.2 | 0.22 | 33.4 |

Although the present invention has been described in detail and with reference to its specific embodiments, it is obvious for those skilled in the art that various changes or modifications can be made on the present invention without departing from the spirit and scope thereof. The present application is based on a Japanese patent application (Japanese Patent Application No. 2016-010448) filed on Jan. 22, 2016, the contents of which are incorporated herein by reference.

DESCRIPTION OF REFERENCE NUMERALS AND SIGNS

1: fluid separation membrane
2: porous carbon fiber
3: organic polymer layer

The invention claimed is:

1. A fluid separation membrane wherein an organic polymer layer is formed on a surface of a porous carbon fiber having a co-continuous porous structure, wherein the co-continuous porous structure is provided all over the porous carbon fiber, and wherein a half-value width of an intensity peak of X-ray scattering of the porous carbon fiber is 5° or less, wherein an average pore diameter of the porous carbon fiber as a whole measured by a mercury intrusion method is 30 nm to 5,000 nm.

2. The fluid separation membrane according to claim 1, wherein an average pore diameter in the surface of the porous carbon fiber measured by surface observation with a scanning electron microscope is 2 nm to 500 nm.

3. The fluid separation membrane according to claim 1, wherein the co-continuous porous structure has a structural period of 10 nm to 10,000 nm.

4. The fluid separation membrane according to claim 1, wherein the organic polymer layer is a layer comprising one or two or more kinds of organic polymers selected from the group consisting of aromatic polyimide, cellulose acetate, polysulfone, aromatic polyamide, polyether imide, polyether sulfone, polyacrylonitrile, polyphenylene sulfide, polyether ether ketone, polytetrafluoroethylene, polyvinylidene fluoride, and derivatives thereof.

5. The fluid separation membrane according to claim 1, wherein the organic polymer layer is a layer comprising one or two or more kinds of organic polymers selected from the group consisting of aromatic polyimide, aromatic polyamide, and derivatives thereof.

6. A fluid separation membrane module in which a plurality of the fluid separation membranes according to claim 1 are housed in a casing.

7. The fluid separation membrane according to claim 1, wherein the area ratio of the cross-sectional area A of the hollow portion to the cross-sectional area B of the porous carbon fiber (hollow area ratio A/B) is 0.001 to 0.7.

* * * * *